Aug. 19, 1941.  J. GOLDSTEIN  2,252,922
OPHTHALMIC MOUNTING
Filed Jan. 31, 1939
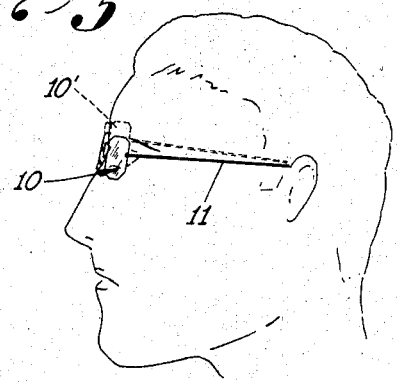
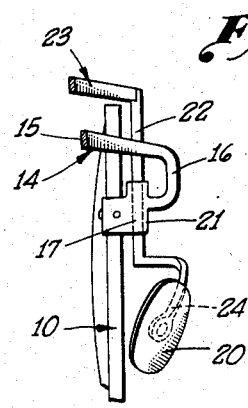
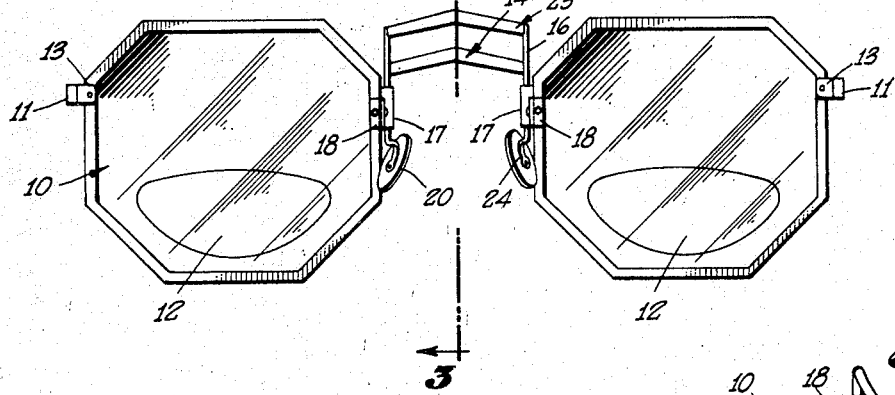
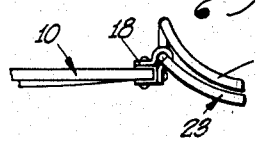
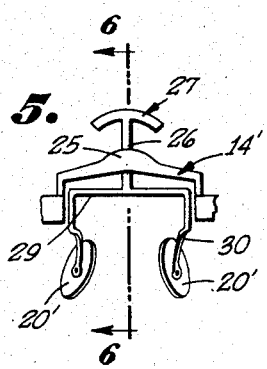
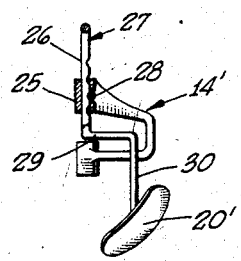
JOSEPH GOLDSTEIN
INVENTOR
BY
ATTORNEY.

Patented Aug. 19, 1941

2,252,922

UNITED STATES PATENT OFFICE 2,252,922

OPHTHALMIC MOUNTING

Joseph Goldstein, Los Angeles, Calif.

Application January 31, 1939, Serial No. 253,834

1 Claim. (Cl. 88—49)

This invention pertains to ophthalmic mountings and is particularly directed toward a mounting adapted for use with bifocal or trifocal lenses, i. e., lenses having portions or areas differing in index of refraction or focal length. The ophthalmic mounting of this invention includes adjustable means for elevating and lowering the lenses while they are being worn so as to permit the wearer to more effectively utilize a desired area or section of the lenses.

By reason of loss of accommodation, people above the age of 40 ordinarily require bifocal lenses or need lenses facilitating vision at short range only, or at distance only. In order to obviate the necessity of continually changing lenses or glasses, these persons wear what are known as bifocal lenses, i. e., lenses having areas (generally in the lower sections) which have a refractive index and focal length designed to correct vision at short range only, the upper portions of the lenses being specifically designed to improve vision at a distance only. Persons requiring the use of bifocal lenses are often annoyed and inconvenienced by the fact that they need move their whole heads in order to maintain a desired portion of the lenses between them and an object which they wish to examine. This is particularly noticeable, for example, when a person desires to look at something within reach but at eye level.

In order to obviate these difficulties, the present invention provides an ophthalmic mounting which permits the wearer to adjust the elevation of the lenses with respect to the nose pads or pupillary axis, in a simple and ready manner. Generally stated, the invention pertains to an ophthalmic mounting including a bridge adapted to connect lenses in spaced relation and an adjustably positionable member carried by said bridge and extending thereabove, the lower ends of such member being provided with nose pads whereby the elevation of the bridge and lenses may be varied by adjustably positioning said member with respect to said bridge.

An object of the present invention, therefore, is to disclose and provide an ophthalmic mounting particularly adapted for use with lenses having areas differing in focal length or in corrective value.

A further object is to provide an ophthalmic mounting including a bridge and a movably adjustable member whereby the elevation of the bridge may be readily changed.

These and other objects will be apparent to those skilled in the art from the following detailed description of certain illustrative forms of the invention.

In the appended drawing:

Fig. 1 is a diagrammatic side view showing the positions of spectacles or other lenses which may be attained by the use of the improved mounting.

Fig. 2 is a front elevation of spectacles provided with one form of mounting embraced by this invention.

Fig. 3 is a vertical section taken along the plane 3—3 of Fig. 2.

Fig. 4 is a plan view of a portion only of the mounting shown in Figs. 2 and 3.

Fig. 5 is a front view of a modified form of mounting.

Fig. 6 is a vertical section taken along the plane 6—6 of Fig. 5.

It is to be understood that the mounting of this invention may be used with various forms of frames and that the lenses themselves may be completely or partially surrounded by a frame or the lenses themselves may be unprotected by any rigid framework.

In Fig. 1 the person there shown is provided with spectacles 10 having bows 11. If the lower section of the lenses of the spectacles 10 is provided with an area particularly adapted for correction of vision at short range, then the wearer can only utilize such lower section by looking downwardly through the lower section of his lenses. If, however, he wishes to enlarge his field of view while still employing the lower section of the lenses, then by means of the adjustable mounting of this invention he may raise or elevate his spectacles to a position indicated at 10', this adjustment being accomplished in a very simple and facile manner as will become apparent hereafter.

Fig. 2 illustrates one form of spectacles provided with the mounting of this invention. The lower section of the lens 10, indicated at 12, is that section which is particularly designed to correct vision at short range. The bows may be hingedly connected to the lens 10 as at 13. The two lenses are maintained at a desired interpupillary distance by means of a bridge member 14, which bridge member may include the crest 15 curving rearwardly from a forward point immediately above the nose and then downwardly as indicated at 16, the lower end of the portion 16 being then bent forwardly and terminating at a section 17 adapted to be attached to the frame of the spectacles, or said end portion 17 may include lugs 18 adapted to grasp and be fastened to the edge of the lens.

A portion of the bridge 14 is adapted to slidably or adjustably receive a member carrying the nose pads 20. As shown in Figs. 2, 3 and 4, the bridge member 14 is provided with a boss, indicated at 21, which is bored so as to slidably and frictionally receive downwardly extending legs 22 of a member generally indicated at 23. The lower ends of the legs 22 may be suitably bent or curved as indicated in Fig. 3, such lower ends terminating in arms 24 adapted to receive and hold the nose pads 20. Ordinarily, the nose pads 20 are attached to the arms 24 by a rivet, permitting angular adjustment and a certain amount of freedom of movement to the pads 20.

The boss 21 may be solid or it may be made by bending over sections of metal adjacent the boss so as to encircle and frictionally grasp the downwardly extending legs 22 of the member 23.

It is to be noted that the member 23 may be moved up or down with respect to the bridge 14. Downward movement of the member 23 will cause the bridge 14 to be raised or elevated with respect to the nose pads 20 and therefore with respect to the pupillary axes of the wearer. When the bridge 14 is thus raised, the wearer will then be able to look through the lower sections 12 of his lenses without necessarily lowering his eyes.

Figs. 5 and 6 show a modified form of mounting in which the bridge member 14' is provided with a centrally positioned enlarged portion 25 provided with a bore adapted to receive the shank 26 of an adjustable member 27. The rear wall of the enlarged portion 25 may be open and a small flexible spring or wire 28 may be carried by the bridge 14' and extend through the opening in the wall of the enlargement 25, said spring or wire being adapted to engage minor indentations formed in the back portion of the shank 26 of the member 27; the lower portion of the shank 26 of the adjustable member may then be provided with a cross piece 29, the ends of said cross piece extending downwardly as at 30 and connecting with the nose pads 20'. In this modification it will be seen that the elevation of the bridge 14' with respect to the nose pads 20' may be readily changed by moving the member 27 into desired position, the small wire or spring 28 facilitating retention of the member 27 in desired position after it is adjusted.

Numerous other forms of the invention will become apparent to those skilled in the art from the description given herein. It is to be noted that adjustments are accomplished without the aid of tools so that the wearer may make the desired adjustment at any time with practically no effort. The appearance of the device may be changed in any suitable manner, depending upon the metals or materials employed in making the mounting, the amount and type of decoration desired, and the general style of the lenses. The invention is not to be limited, therefore, to the specific forms shown.

I claim:

In an ophthalmic mounting for bifocal lenses, spaced lens holding elements, a bridge fixedly extending between said elements having an enlarged central portion, a guiding aperture extending vertically through said central portion of said bridge, means for supporting said mounting comprising a pair of nose pads below said bridge, and a vertically extending bar connected with the nose pads extending through said guiding aperture and terminating in a transverse bar above said bridge, whereby said bar may be moved conveniently with respect to the bridge to adjust the level of the nose pads with respect to said lens holding elements, and spring means arranged on said enlarged central portion of said bridge and adapted to engage indentations in said vertically extending bar for resiliently maintaining the parts in adjusted position.

JOSEPH GOLDSTEIN.